US010171223B2

(12) United States Patent
Burchard et al.

(10) Patent No.: US 10,171,223 B2
(45) Date of Patent: Jan. 1, 2019

(54) METHOD AND APPARATUS FOR DYNAMICALLY ASSIGNING MASTER/SLAVE ROLES WITHIN A DISTRIBUTED ANTENNA DIVERSITY RECEIVER APPARATUS

(71) Applicant: NXP B.V., Eindhoven (NL)

(72) Inventors: Artur Tadeusz Burchard, Eindhoven (NL); Nur Engin, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/867,299

(22) Filed: Jan. 10, 2018

(65) Prior Publication Data
US 2018/0205508 A1    Jul. 19, 2018

(30) Foreign Application Priority Data
Jan. 17, 2017  (EP) ..................................... 17151760

(51) Int. Cl.
*H04L 27/06* (2006.01)
*H04L 5/00* (2006.01)
*H04B 7/022* (2017.01)
*H04B 7/024* (2017.01)
*H04W 84/20* (2009.01)
(Continued)

(52) U.S. Cl.
CPC ............ *H04L 5/006* (2013.01); *H04B 7/022* (2013.01); *H04B 7/024* (2013.01); *H04B 7/086* (2013.01); *H04B 7/0862* (2013.01); *H04L 25/0204* (2013.01); *H04W 84/20* (2013.01)

(58) Field of Classification Search
CPC ..... H04L 5/006; H04L 25/0204; H04B 7/086; H04B 487/024; H04B 7/022; H04B 7/024; H04W 84/20
See application file for complete search history.

(56) References Cited

U.S. PATENT DOCUMENTS 8,155,082 B2    4/2012  Yamaguchi et al.
8,644,430 B1 *  2/2014  Perahia ..................... H04B 7/10
                                                 375/316
(Continued)

FOREIGN PATENT DOCUMENTS

EP        1 652 348 B1    7/2008
EP        2 061 159 A1    5/2009
WO     2005/015842 A1    2/2005

*Primary Examiner* — Dac V Ha
(74) *Attorney, Agent, or Firm* — Rajeev Madnawat

(57) ABSTRACT

A wireless receiver for a distributed antenna diversity receiver apparatus comprising a pre-combining component arranged to receive an RF signal from an antenna and to recover and output an information signal contained within the received RF signal, and a combined-signal component arranged to receive the recovered information signal output by the pre-combining component of the wireless receiver and a further recovered information signal from a further wireless receiver and to perform diversity combining of the recovered information signals to obtain and output an enhanced information signal. The wireless receiver further comprises a monitoring component arranged to receive intra-packet channel reliability parameters for the wireless receiver and for the further wireless receiver, determine whether to assign a new master receiver for the distributed antenna diversity receiver apparatus based on the received intra-packet reliability parameters.

15 Claims, 7 Drawing Sheets

(51) Int. Cl.
  *H04B 7/08* (2006.01)
  *H04L 25/02* (2006.01)

(56) References Cited

U.S. PATENT DOCUMENTS

| | | | |
|---|---|---|---|
| 9,071,326 B2 | 6/2015 | Koppelaar et al. | |
| 9,426,842 B2 | 8/2016 | Koppelaar et al. | |
| 2006/0293006 A1* | 12/2006 | Taniguchi | H04B 7/0817 455/132 |
| 2008/0151801 A1* | 6/2008 | Mizuta | H04W 52/343 370/311 |
| 2011/0293025 A1 | 12/2011 | Mudulodu et al. | |
| 2012/0057508 A1* | 3/2012 | Moshfeghi | H04B 1/28 370/277 |
| 2014/0192927 A1* | 7/2014 | Kim | H04B 7/0689 375/299 |
| 2016/0344435 A1 | 11/2016 | Hekstra et al. | |

* cited by examiner

METHOD AND APPARATUS FOR DYNAMICALLY ASSIGNING MASTER/SLAVE ROLES WITHIN A DISTRIBUTED ANTENNA DIVERSITY RECEIVER APPARATUS

CROSS-REFERENCE TO RELATED APPLICATIONS

This application claims the priority under 35 U.S.C. § 119 of European Patent application no. 17151760.0, filed on Jan. 17, 2017, the contents of which are incorporated by reference herein.

FIELD OF THE INVENTION

This invention relates to a method and apparatus for dynamically assigning master/slave roles within a distributed antenna diversity receiver apparatus, and in particular to wireless receiver for a distributed antenna diversity receiver apparatus arranged to perform such a method for dynamically assigning master/slave roles within a distributed antenna diversity receiver apparatus.

Background of the Invention

Intelligent transportation systems (ITS) are applications which provide, for example, services relating to transport and traffic management and enable various users to be better informed and make safer, more coordinated, and 'smarter' use of transport networks. Although ITS may refer to all modes of transport, ITS is defined in EU Directive 2010/40/EU (7 Jul. 2010) as systems in which information and communication technologies are applied in the field of road transport, including infrastructure, vehicles and users, and in traffic management and mobility management, as well as for interfaces with other modes of transport.

Various forms of wireless communications technologies have been proposed for intelligent transportation systems. IEEE 802.11p is an approved amendment to the IEEE 802.11 standard to add Wireless Access in Vehicular Environments (WAVE), a vehicular communication system. It defines enhancements to 802.11 (the basis of products marketed as Wi-Fi) required to support ITS applications. This includes data exchange between high-speed vehicles and between the vehicles and the roadside infrastructure, so called V2X communication.

FIG. 1 illustrates a simplified block diagram of a conventional 802.11p receiver. During wireless transmission, a transmitted signal ('x') is distorted by a transmission channel ('H') through which the signal propagates, and the resulting signal ('r') at a receiver is a combination of both the transmitted signal x and the channel distortion H. A mobile multipath channel creates time and frequency dependent fading. Furthermore, the receiver circuits add noise to the received signal.

These factors result in transmission errors. At the receiver the signal to noise ratio (SNR) determines reception performance, which is measured as the number of errors in the received signal.

In order to receive the original transmitted signal x correctly at a receiver the effect of the transmission channel H needs to be calculated (or estimated) and the channel distortion removed from the received signal. The 802.11p standard, as with other WiFi standards such as 802.11a, 802.11g, 802.11n, 802.11ac, etc., is packet based and each packet consists of preamble symbols and data symbols. Since WiFi was originally designed for static (indoor) channels, the standard technique is to perform channel estimation once per packet during preamble and to apply the estimated channel for all the subsequent incoming data symbols within the packet. For every new packet a new channel is to be estimated. In FIG. 1, such initial channel estimation is performed within an initial channel estimate path indicated at 100.

In case of a mobile channel such as typically would be experienced in V2X communications, the channel characteristics will be time-varying. Accordingly, the channel needs to be estimated and tracked frequently such that channel changes are tracked continuously. Thus, for V2X communication involving a mobile channel, the channel should be estimated more frequently than once per packet. Accordingly, channel estimation needs to be performed mid-packet, and thus using data symbols. This can be done by implementing a channel tracking loop, such as indicated at 110.

One of the techniques to further improve reception is the use of multiple antennas (antenna diversity) at the receiving side. The transmitted signal will arrive at different antennas through different paths and therefore will undergo different fading and rotation, e.g. a deep fade on one antenna can be compensated by a good signal at the other antenna at a given time. One example of antenna diversity techniques is Maximal Ratio Combining (MRC), as described in John R. Barry, Edward A. Lee and David G. Messerschmitt, "Digital Communication", Springer, 3rd edition (Sep. 30, 2003), which is incorporated herein by reference. MRC uses the estimated channel amplitude and phase from both antennas to calculate a coherent weighted combining of the signals from two antennas. In this way, a substantial dB gain, e.g. a 3 dB gain, with respect to single antenna can be achieved. Such diversity techniques improve reception for both static and mobile channels and are a common technique for V2X systems, home WiFi routers, etc.

In order to implement antenna diversity, duplication of receiver functionality is required for each antenna up to the combining function. Channel tracking for mobility and diversity are orthogonal concepts and can be combined in one robust receiver architecture. Such a receiver architecture will consist of as many Rx paths as antennas, with each of the Rx paths having a channel tracking loop. FIG. 2 illustrates a simplified block diagram of a 2-antenna diversity receiver comprising channel tracking combined with MRC functionality.

Receivers are typically implemented as integrated circuits where the particular functions are implemented as hardware blocks, software running on (digital signal) processors, or a combination of hardware and software. In order to reduce development and manufacturing costs, it is often preferential to develop and manufacture a single IC design capable of implementing different receiver configurations, for example single antenna configurations as well as multi-antenna diversity configurations. However, in use such an IC design will be underutilized in all but the most demanding of configurations. For example, an IC capable of implementing 2-antenna diversity will only be 50% utilised for a single-antenna configuration. A simple single antenna receiver IC would be less expensive to develop and manufacture in comparison, but would require two different IC designs to be developed in order to enable both single antenna and 2-antenna diversity configurations to be supported.

To overcome this problem, a distributed diversity architecture has been proposed in U.S. patent application Ser. No. 14/307,134, publication number US2015/0016576, (incorporated herein by reference) in which simpler single antenna receiver ICs are connected via a (digital) link to implement antenna diversity using multiple ICs. Such an arrangement enables a scalable system solution whereby more complex functionality is achieved through multiple simpler ICs. An additional issue that such distributed diversity solves is that of when antennas are physically spaced far apart from each other (for example located in a vehicle mirror and another located in a roof top module). In a conventional single IC architecture, an expensive high frequency coaxial cable would need to be used to connect at least one of the distantly located antennas to the receiver IC. However, in a distributed diversity architecture, the simpler single antenna receiver ICs can each be located near to their respective antennas and connected digitally by, for example, twisted pair cables.

FIG. 3 illustrates a simplified block diagram of an example of such a distributed diversity architecture as disclosed in US2015/0016576. A first receiver IC 310 is arranged to provide full Rx functionality including diversity combining (MRC) and further processing of the combined-signal, and is hereinafter referred to as the master receiver. One or more further receiver ICs, such as the receiver IC 320 illustrated in FIG. 2, is arranged to provide partial Rx functionality up to (but not including) diversity combining. The digital interface 330 between the master receiver 310 and the slave receiver 320 comprises a bi-directional link whereby in the uplink channel the slave receiver 320 sends received data and in the downlink the master receiver 310 provides channel estimates (Tx-Est) for the slave receiver 320. It would be possible for the slave receiver 320 to compute its own channel estimates, but since they would be derived solely from the local data stream they would have worse quality that the channel estimates computed by the master receiver 310 based on the combined data streams.

Although only one slave receiver 320 is illustrated in FIG. 2, multiple slave receivers 320 may be coupled to a master receiver 310, for example in a chain, and the amount of data exchanged between the master and slave receivers 310, 320 over the digital link 330 can be very large.

In order to reduce bandwidth of the digital link 330, and thus the complexity and cost of the digital link, the slave receiver 320 is arranged to perform data compression of the received data sent to the master receiver 310 over the digital link 330, and the master receiver 310 is arranged to perform de-compression of the compressed data received from the slave receiver 320. The master receiver 310 may also be arranged to perform compression of the channel estimates sent to the slave receiver 320 over the digital link 330, and the slave receiver 320 may thus also be arranged to perform de-compression of the compressed channel estimates received from the master receiver 310.

Advantageously, the compression of the received data performed by the slave receiver 320 can be lossy since it is only auxiliary data used improve the accuracy of the main data stream received by the master receiver 310. There is a trade-off between compression level and the diversity combining gain.

A problem with this known distributed diversity scheme is that the master and slave receivers 310, 320 are typically assigned their respective master/slave roles at design time, or at radio configuration. If the master/slave roles were capable of being dynamically assigned, selection of the master device can be done based on the different parameters that assess the channel reliability, for example signal strength (e.g. received signal strength indication—RSSI), estimated SNR or signal to interference plus noise ratio (SINR) of both receivers, Bit Error Rate (BER), packet drop rate, etc. The receiver with stronger signal/higher SNR/SINR should be the master receiver and the receiver with weaker signal/lower SNR/SINR should be the slave receiver.

However, in low SNR cases, the signals are of comparable strength and it is difficult to decide which signal should be set as the master and which should be set as the slave. This is because signals strength fluctuates, especially in case of the mobile channel. It can happen that a signal that was evaluated to be stronger becomes weaker during data symbol processing in the packet, or even still in the preamble prior to data reception. Since slave data is compressed, sometimes even aggressively, if the slave signal becomes stronger, the information from the stronger, more important signal will be lost through the compression. Significantly, in such a case of a 2-antenna diversity system which uses as its master signal the weaker of the two signals, and as its compressed slave signal the stronger signal, the performance can be worse than for a simple single antenna receiver.

The above identified problems are not only applicable to intelligent transportation systems (e.g. a V2X systems), but equally to other communications systems with a similar OFDM-based architecture such as, for example, DAB (Digital Audio Broadcasting) systems, DVB-T (Digital Video Broadcasting-Terrestrial) systems, Digital Radio Mondiale (DRM) systems etc.

SUMMARY OF THE INVENTION

The present invention provides a wireless receiver for a distributed antenna diversity receiver apparatus, a distributed antenna diversity receiver apparatus, a distributed wireless communication system and a method of dynamically assigning master/slave roles within a distributed antenna diversity receiver apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings in which there are illustrated example embodiments. However, it will be appreciated that the present invention is not limited to the specific embodiments herein described and as illustrated in the accompanying drawings, and various modifications and alternatives may be made without detracting from the inventive concept.

According to some example embodiments, there is proposed a method and apparatus for dynamically configuring master and slave receivers within a distributed antenna diversity receiver apparatus. For example, when a slave signal has a higher SNR than the master signal, the logical notion of master-slave is reversed. Accordingly, it is proposed to detect when the master/slave assignment of receivers is no longer appropriate, for example due to changes in the transmission channels, and to dynamically re-assign the master and slave roles as appropriate.

Figure 4:
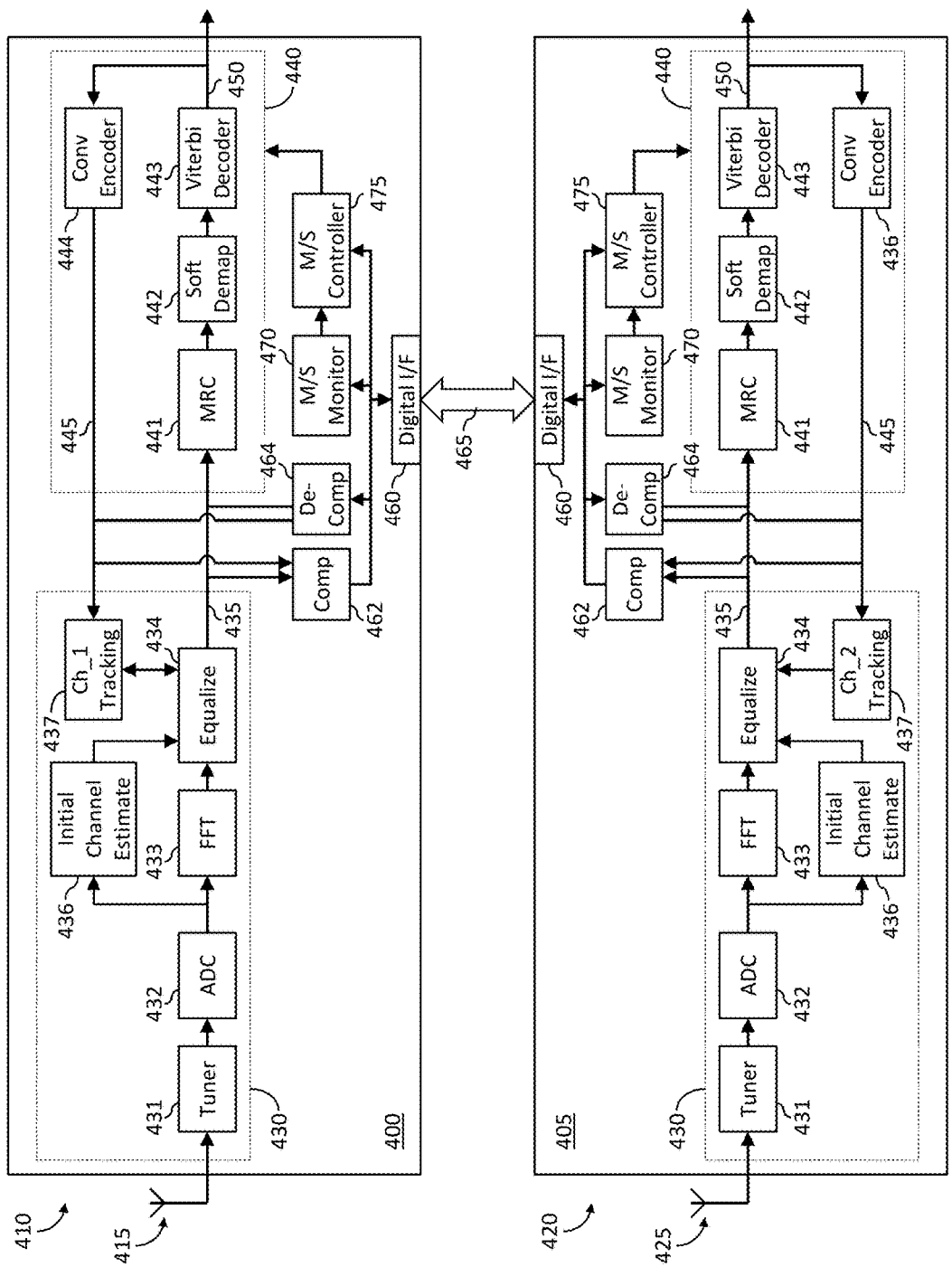
FIG. 4 illustrates a simplified block diagram of an example embodiment of a part of a distributed antenna diversity receiver apparatus.

Referring now to FIG. 4, there is illustrated a simplified block diagram of an example embodiment of a part of a distributed antenna diversity receiver apparatus 400 arranged to form a part of a distributed wireless communication system, such as may be implemented within intelligent transportation systems (e.g. a V2X system), DAB system, DVB-T system, DRM system or other system with a similar OFDM-based architecture. In particular, FIG. 4 illustrates a part of a first wireless receiver 410 and a part of a second wireless receiver 420 arranged to form part of the distributed antenna diversity receiver 400. Although two wireless receivers 410, 420 are illustrated, it will be appreciated that the distributed antenna diversity receiver 400 may comprise more than two wireless receivers. Each of the wireless receivers 410, 420 is arranged to be coupled to a respective antenna 415, 425 and to receive radio frequency (RF) signals from the respective antenna 415, 425. The wireless receivers 410, 420 illustrated in FIG. 4 are individually implemented within separate integrated circuit devices 400, 405, thereby enabling the wireless receivers 410, 420 to be located near to their respective antennae 415, 425 even if the antennae 415, 425 are spaced far apart from one another.

Figure 1:
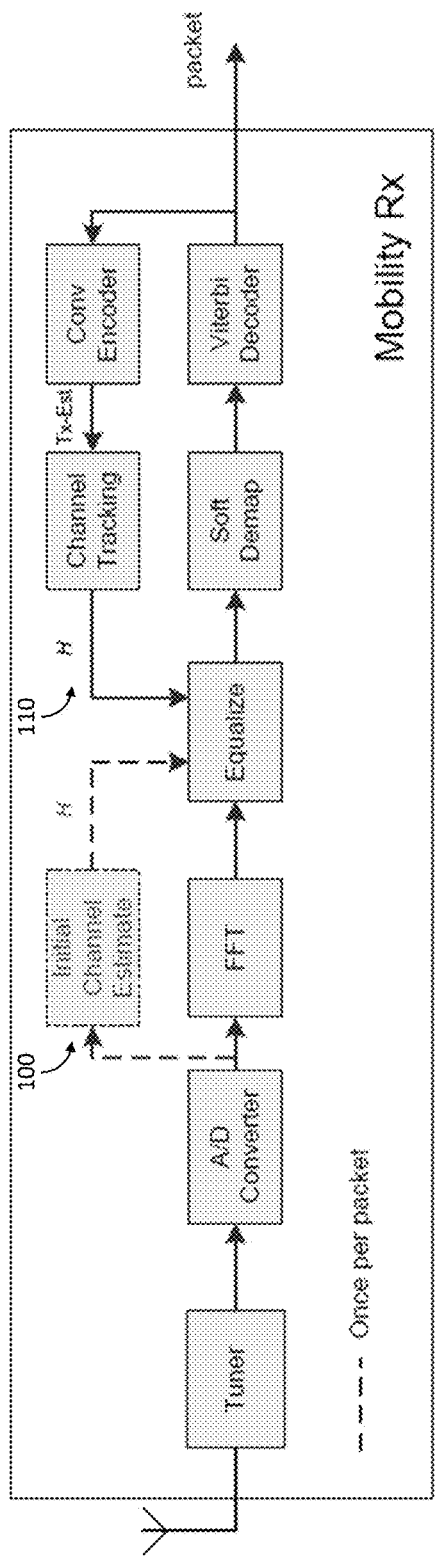
FIG. 1 illustrates a simplified block diagram of a conventional 802.11p receiver.
Figure 5:
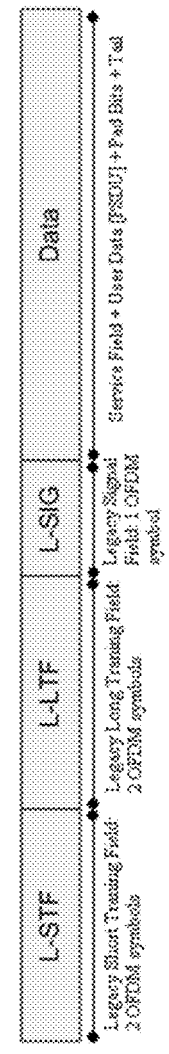
FIG. 5 illustrates an example packet structure of a received packet.
Figure 2:
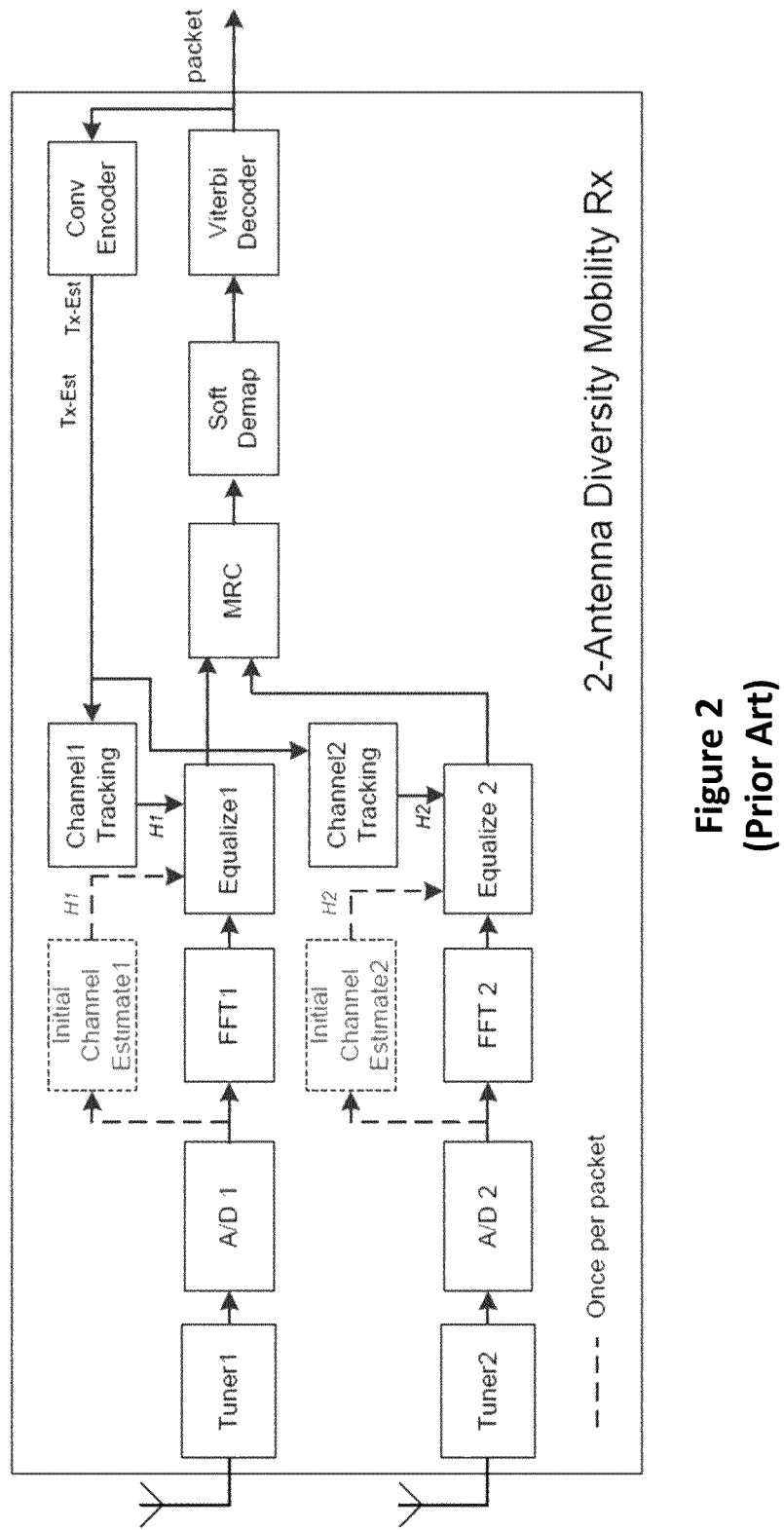
FIG. 2 illustrates a simplified block diagram of a 2-antenna diversity receiver comprising channel tracking combined with MRC functionality.
Figure 3:
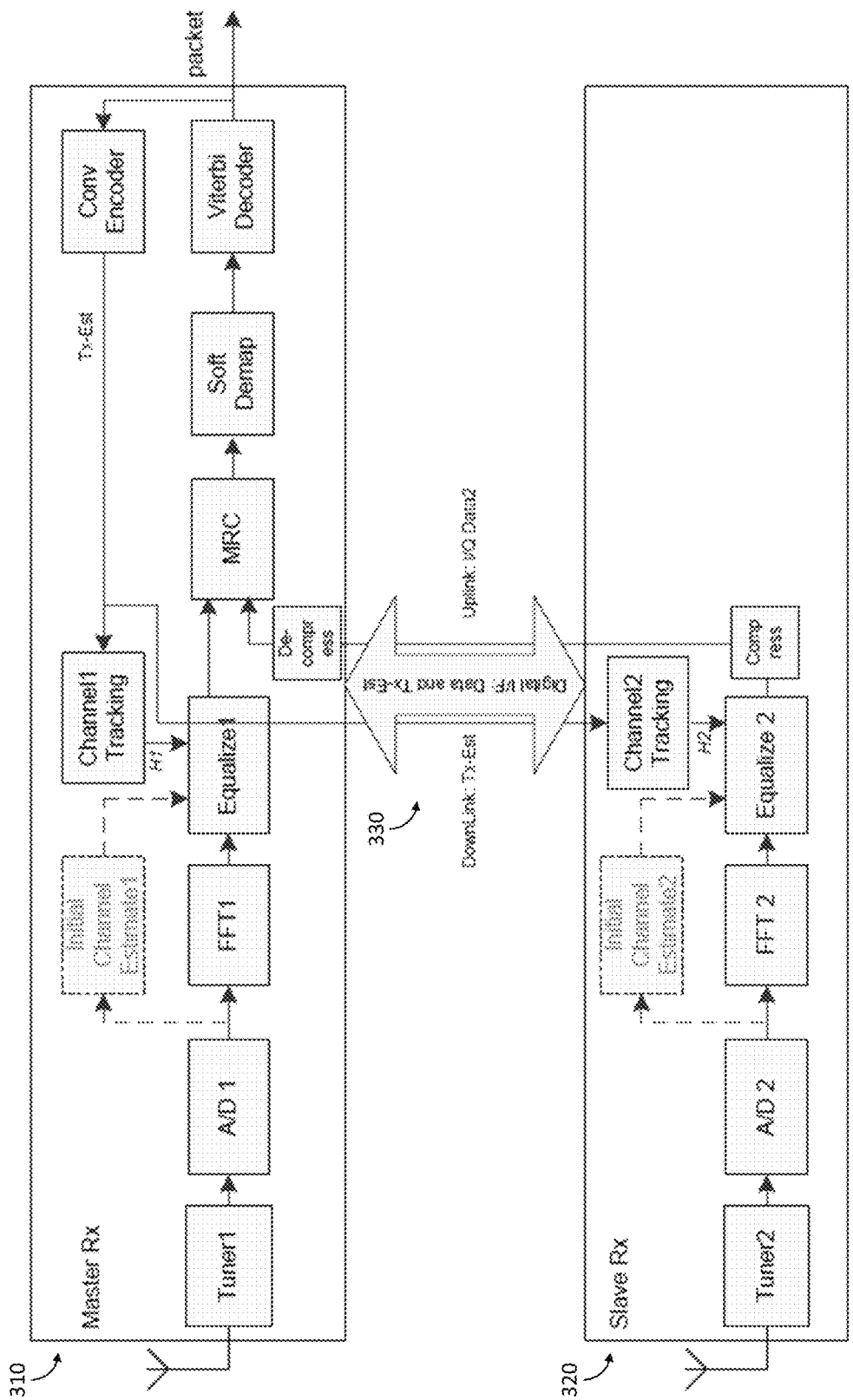
FIG. 3 illustrates a simplified block diagram of an example of such a distributed diversity architecture.

Each of the wireless receivers 410, 420 comprises a pre-combining component 430 and a combined-signal component 440. In the illustrated example, the pre-combining component 430 comprises a tuner 431, an analogue-to-digital converter 432, a fast Fourier transform module 433 and an Equalizer module 434. The pre-combining component 430 illustrated in FIG. 4 further comprises an initial channel estimate module 436 arranged to perform initial channel estimation, for example based on preamble symbols within a received packet. An example packet structure of a received packet is illustrated in FIG. 5. The channel may initially be estimated using the packet preamble which in the example illustrated in FIG. 5 consists of L-STF (legacy long training field) and L-LTF (legacy long training field). Since the preamble symbols are known, the channel response can be estimated based on the received signal as compared with the expected signal. An initial channel estimate is provided to the equalizer component 434, which uses the received initial channel estimate to remove channel distortion from the received signal in order to recover the original transmitted signal. The equalizer component 434 then outputs the recovered information signal 435.

In case of a mobile channel such as typically would be experienced in V2X communications, the channel characteristics will be time-varying. Accordingly, the channel needs to be estimated and tracked frequently such that channel changes are tracked continuously. Accordingly, the pre-combining component 430 further comprises a channel tracking component 437 arranged to generate intra-packet channel estimate data based on channel estimate information, for example based on re-encoded data symbols 445, and to provide the intra-packet channel estimate data to the equalizer component 434 during reception of a packet. The equalizer component 434 may thus be arranged to use the most recently received channel estimate data to remove channel distortion from the received signal.

In the illustrated example, the combined-signal component 440 of each wireless receiver 410, 420 comprises a diversity combining module 441, for example a Maximal Ratio Combining (MRC) module, arranged to receive the recovered information signal 435 output by the respective pre-combining component 430 and at least one further recovered information signal 435 from at least one further wireless receiver 410, 420, such as described in greater detail below. The diversity combining module 441 performs diversity combining of the recovered information signals 435 to obtain an enhanced information signal. In the illustrated example, soft de-mapping of the enhanced recovered information signal is then performed by a soft de-mapping module 442 before a Viterbi decoder module 443 decodes the de-mapped recovered information signal to obtain data 450 contained within the recovered information signal, which is output by the receiver. In the illustrated example, a convolutional encoder module 444 is arranged to re-encode the decoded data 450, and to provide the re-encoded data symbols 445 to the channel tracking component 437 of the respective pre-combining component 430.

As will be appreciated by a person skilled in the art, the combining function, e.g. the MRC module 441 in the example illustrated in FIG. 4, may be positioned in different locations ahead of the Viterbi decoder module 443 within the receive chains of the wireless receivers 410, 420 depending on the algorithms implemented.

Each of the wireless receivers 410, 420 further comprises a digital interface component 460 to enable a bi-directional digital link 465 between the respective wireless receiver 410, 420 and one or more further wireless receivers. In the illustrated example, each of the wireless receivers 410, 420 further comprises a compression module 462 for compressing data transmitted via the digital interface component 460 and a de-compression module 464 for de-compressing compressed data received via the digital interface component 460. In accordance with some example embodiments, each of the wireless receivers 410, 420 is configurable to operate in a master receiver role and a slave receiver role.

When configured to operate in the master receiver role, a wireless receiver 410, 420 is arranged to receive compressed recovered information 435 and intra-packet channel reliability parameters (e.g. signal strength (e.g. received signal strength indication (signal energy) RSSI), estimated signal to noise ratio (SNR), signal to interference plus noise ratio (SINR), bit error rate (BER), packet drop rate, etc.) from wireless receivers 410, 420 operating in the slave receiver role via the digital link 465, perform decompression of the compressed recovered information and provide the decompressed recovered information to the combined-signal component for performing diversity combining, and derive channel estimate information for the wireless receivers 410, 420 operating in the slave receiver role based on the received intra-packet channel reliability and to transmit the derived channel estimate information back to the wireless receivers 410, 420 operating in the slave receiver role.

Conversely, when configure to operate in the slave receiver role, a wireless receiver 410, 420 is arranged to perform compression of recovered information 435 output by the pre-combining component 430, transmit the compressed recovered information to a wireless receiver configured to operate in the master receiver mode for performing diversity combining, receive channel estimate information from the wireless receiver configured to operate in the master receiver mode, and perform channel tracking for recovering the information signal contained within the received RF signal based on the received channel estimate information.

Each of the wireless receivers 410, 420 further comprises a monitoring component 470. Each monitoring component 470 is arranged (when enabled) to receive intra-packet channel reliability parameters for each wireless receiver 410, 420 within the distributed antenna diversity receiver apparatus 400, determine whether to assign a new master receiver for the distributed antenna diversity receiver apparatus based on the received intra-packet reliability parameters, and if it is determined to assign a new master receiver to dynamically re-assign the master receiver within the distributed antenna diversity receiver apparatus 400. In accordance with some example embodiments, it is contemplated that each monitoring component 470 may be arranged to be enabled when the respective wireless receiver 410, 420 is operating in a master receiver mode and to be disabled when the respective wireless receiver 410, 420 is operating in a slave receiver mode. In this manner, only one monitoring component 470 may be enabled at a time within the distributed antenna diversity receiver apparatus 400, i.e. within the master receiver of the distributed antenna diversity receiver apparatus 400.

Figure 6:
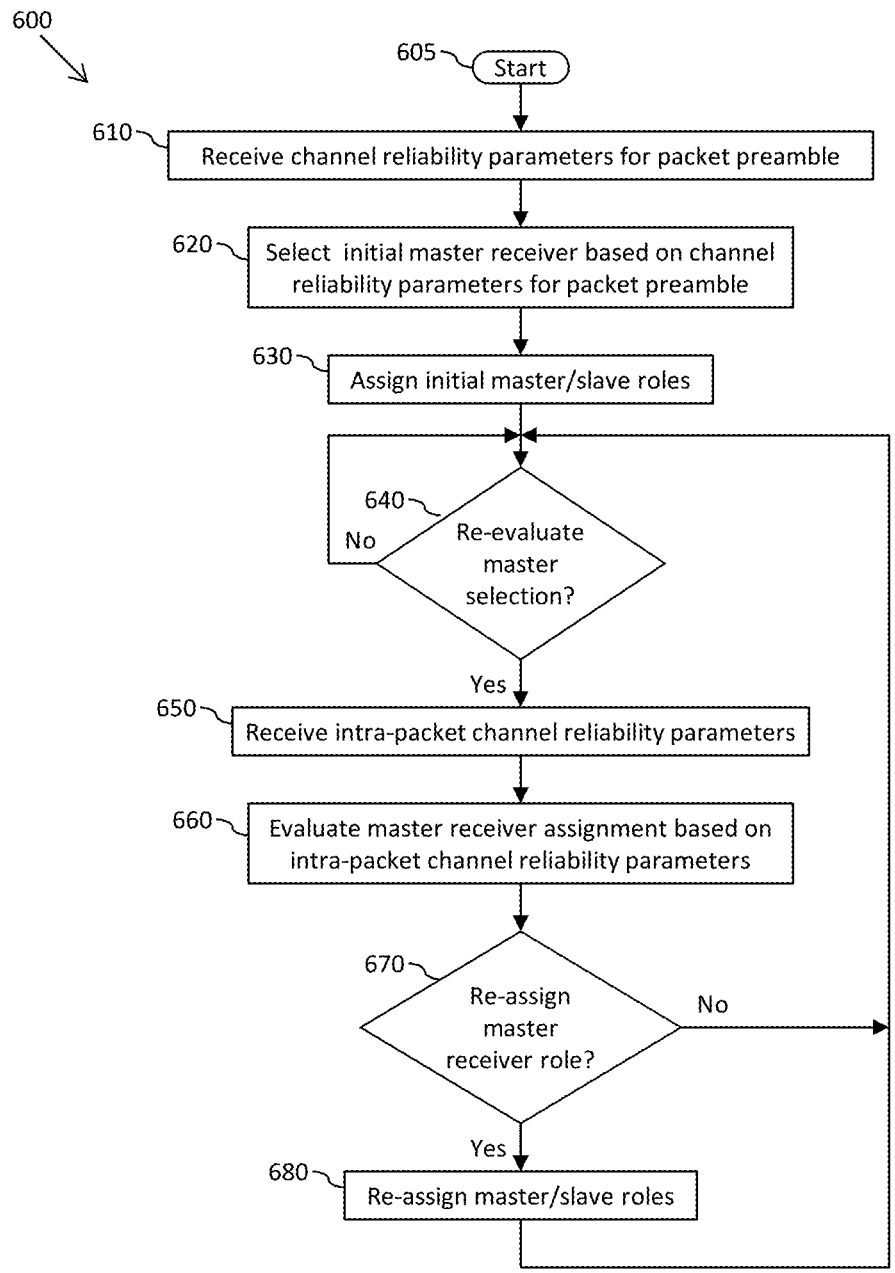
FIGS. 6 to 8 illustrate simplified flowcharts of parts of a method of dynamically assigning master/slave roles within a distributed antenna diversity receiver apparatus.

FIG. 6 illustrates a simplified flowchart 600 of an example of a method of dynamically assigning master/slave roles within a distributed antenna diversity receiver apparatus, such as may be implemented within the monitoring components 470 of the wireless receivers 410, 420 illustrated in FIG. 4. The method of FIG. 6 starts at 605 and moves on to 610 where initial channel reliability parameters for a preamble of a data packet being received in relation to a master receiver and one or more slave receivers are received. An initial master receiver is then selected, at 620, based on the received initial channel reliability parameters. The selection of a master receiver may be achieved based on various different parameters that assess the channel reliability such as, for example, signal strength (e.g. received signal strength indication (signal energy) RSSI), estimated signal to noise ratio (SNR), signal to interference plus noise ratio (SINR), bit error rate (BER), packet drop rate, etc. The receiver with the strongest signal, highest SNR/SINR and/or lowest BER/packet drop rate may accordingly be selected as the master receiver. In the example illustrated in FIG. 6, the initial master receiver is selected on channel reliability parameters for a preamble of a data packet being received. For example, for the frame structure illustrated in FIG. 5, such channel reliability parameters may be obtained during reception of the preamble consisting of the L-STF (legacy long training field) and the L-LTF (legacy long training field). For example, energy (RSSI) can be estimated during L-STF, whilst SNR can be estimated during L-LTF. A monitoring component 470 of one of the wireless receivers 410, 420 illustrated in FIG. 4 arranged to perform dynamic assignment of master and slave roles may receive the channel reliability parameters for its respective wireless receiver 410, 420 directly from the respective pre-combining component 430. The other wireless receivers 410, 420 may be arranged to transmit their channel reliability parameters via the digital link 465. In some example embodiments, the channel reliability parameters may first be provided to a compression function 462 to compress the reliability parameters prior to being transmitted via the digital link 465, and subsequently decompressed by a decompression function 464 prior to being received by the monitoring component 470 performing the dynamic assignment of master and slave roles. Alternatively, in the case where SNR is used for the channel reliability parameters, the master receiver is able to derive the SNR for a slave receiver channel from the (compressed) recovered information signal 435 for that slave receiver.

Referring back to FIG. 6, having selected an initial master receiver, the method moves on to 630 wherein initial master and slave roles are assigned to the wireless receivers of the distributed antenna diversity receiver apparatus, with the selected initial master receiver being assigned a master role and all other wireless receivers being assigned a slave role. In the illustrated example, the method then waits until re-evaluation of the master selection is to be performed, at 640. For example, re-evaluation of the master selection may be performed every given number n of symbols of a data packet being received, whereby it is determined whether to assign a new master receiver for the distributed antenna diversity receiver apparatus. Thus, the relevant monitoring component 470 illustrated in FIG. 4 may be arranged to determine whether to assign a new master receiver for the distributed antenna diversity receiver apparatus every n symbols of a data packet being received, where n≥1. It is further contemplated that the number n of symbols may be dynamically configured based on, for example, previous master re-assignments for the data packet being received. For example, n may initially be set to a default pre-defined value. During reception of a data packet, if re-assignment of the master receiver role is being performed frequently then n may be reduced in value to increase the frequency with which re-evaluation is performed in order to ensure the most appropriate wireless receiver is assigned the master receiver role at any given time. Conversely, if re-assignment of the master receiver role is not performed often then n may be increased in value to reduce any processing overhead and/or power consumption incurred in re-evaluating the master selection.

Once the criteria for performing re-evaluation of the master selection has been met (e.g. the defined number n of symbols have been received), the method moves on to 650 where intra-packet channel reliability parameters for the data packet being received in relation to master receiver and the slave receiver(s) are received. Such intra-packet channel reliability parameters may be requested from slave receivers by the monitoring component 470 of the current master receiver, or the slave receivers may be arranged to automatically transmit their intra-packet channel reliability parameters upon the criteria for performing re-evaluation has been met. It is contemplated that the same parameters that assess the channel reliability may be used for the intra-packet channel reliability parameters as for the initial channel reliability parameters, for example signal strength (e.g. received signal strength indication (signal energy) RSSI), estimated signal to noise ratio (SNR), signal to interference plus noise ratio (SINR), bit error rate (BER), packet drop rate, etc. The monitoring component 470 of the master receiver may receive the intra-packet channel reliability parameters for its respective wireless receiver 410, 420 directly from the respective pre-combining component 430, whilst the slave receivers may be arranged to transmit their intra-packet channel reliability parameters to the monitoring component 470 of the master receiver via the digital link 465, and in some examples the intra-packet channel reliability parameters transmitted via the digital link 465 may be transmitted in a compressed format.

Evaluation of the current master receiver assignment is then performed based on the received intra-packet channel reliability parameters, at 660, to determine whether to assign a new master receiver for the distributed antenna diversity receiver apparatus. For example, such a determination may be based on an absolute difference between the intra-packet reliability parameters for the current master receiver and each of the current slave receivers. If the absolute difference between the intra-packet reliability parameters for the current master receiver and one or more of the current slave receivers exceeds a threshold amount, then it may be determined that the master receiver role is to be re-assigned to the current slave receiver for which the greatest absolute difference exists. Such a threshold may be derived through simulations for a given standard/compression/etc.

Having evaluated the master receiver assignment at 660, it is determined whether to re-assign the master receiver role at 670. If it is determined to re-assign the master receiver role the method moves on to 680, where the master/slave roles are accordingly re-assigned. For example, the wireless receivers 410, 420 illustrated in FIG. 4 each comprises a controller component 475 arranged to configure the respective wireless receiver 410, 420 to operate in one of the master receiver role in which the combined signal component 440 is arranged to perform diversity combining of the recovered information signals 435, and the slave receiver role in which the recovered information signal 435 output by the pre-combining component 430 of the respective wireless receiver 410, 420 is transmitted to a wireless receiver operating in the master receiver role for diversity combining. The monitoring component 470 a wireless receiver 410, 420 operating in the master receiver mode may thus be arranged to re-assign the respective wireless receiver 410, 420 from the master receiver role to the slave receiver role by signalling to the controller component 475 to configure the wireless receiver 410, 420 to operate in the slave receiver role. The controller component 475 of a wireless receiver 410, 420 operating in the master receiver role may further be arranged to re-assign a wireless receiver 410, 420 from a slave receiver role to a master receiver role by signalling to the controller component 475 of said slave wireless receiver 410, 420 via the digital link 465 to reconfigure the wireless receiver 410, 420 to operate in the master receiver role.

Having performed the re-assignment of the master and slave roles at 680, the method then loops back to 630. Conversely, if it is determined not to re-assign the master receiver role at 670, the method loops directly back to 630.

Figure 7:
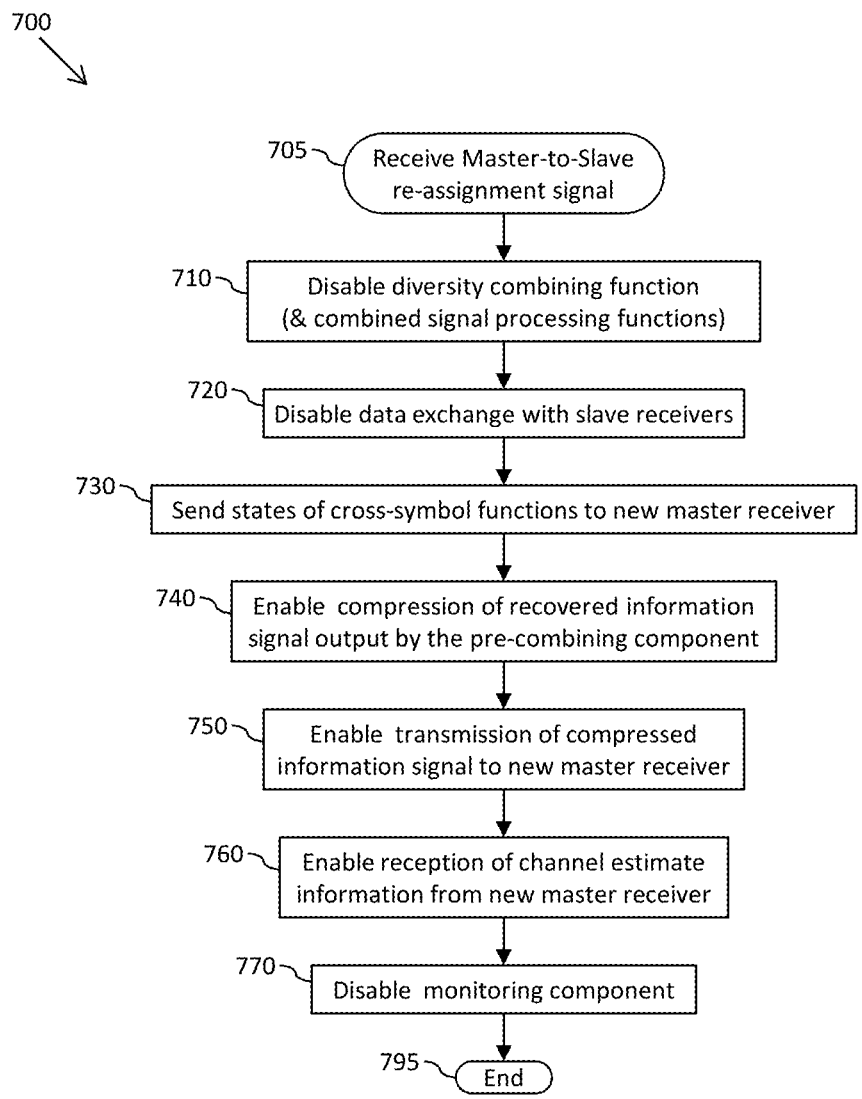

FIG. 7 illustrates a simplified flowchart 700 of an example of a method of re-configuring a wireless receiver from a master receiver role to a slave receiver role, such as may be implemented within the controller components 475 of the wireless receivers 410, 420 of FIG. 4. The method starts at 705 with the receipt of a master-to-slave re-assignment signal, for example received from the monitoring component 470 of the respective wireless receiver 410, 420. A diversity combining function, for example the (MRC) module 441 in FIG. 4, is disabled at 710. In some example embodiments, it is contemplated other processing functionality within the combined-signal component 440 may also be disabled such as the soft de-mapping module 442, the Viterbi decoder module 443 convolution encoder module 444 etc. Data exchange with slave receivers is disabled at 720, for example comprising disabling reception of recovered information 435 and intra-packet channel reliability parameters from slave receivers. The states of cross-symbol functions are transmitted to the newly assigned wireless receiver, at 730. Such cross-symbol functions may comprise, for example, Viterbi state/initialisation, CRC (cyclic redundancy check) state/initialisation, current address to which output data is to be written to, etc. The major cross-symbol processing step in the illustrated example is the Viterbi decoding process. Upon restarting of the Viterbi processing in a newly assigned master receiver, the Viterbi decoder function needs to be initialized to the same state as the Viterbi decoder function in the previously assigned master receiver. One possible implementation for initializing the Viterbi decoder is through exchanging traceback memory (for example 128×64 bits for traceback depth=128) whereby butterfly decisions are traced back one by one, or alternatively only exchanging the past bits (in this case 128 bits) from which the traceback memory is created and feeding then to the Viterbi decoder of the newly assigned master receiver to re-calculate the state. This second option requires less bandwidth but creates additional delay (128 cycles) when changing master-slave configuration. An alternative implementation for initializing the Viterbi decoder is through register exchange whereby for each butterfly decision the complete path memory is copied into a register, so at the end the decoded sequence is available without doing an additional traceback step. The contents of the register from a previously assigned master receiver may thus be exchanged with the newly assigned master receiver and used as the state of the Viterbi decoder within the newly assigned master receiver. Furthermore, it is possible to take a part of (e.g. last 50%) the traceback at the cost of some performance degradation. Then the Viterbi decoder of the newly assigned master receiver can extend the traceback to 100% length at the beginning.

Compression of recovered information output by pre-combining component is enabled at 740. Transmission of compressed recovered information to newly assigned master receiver is enabled at 750. Reception of channel estimate information from newly assigned master receiver is enabled at 760. The monitoring component 470 is then disabled at 770, and the method ends at 795.

Figure 8:
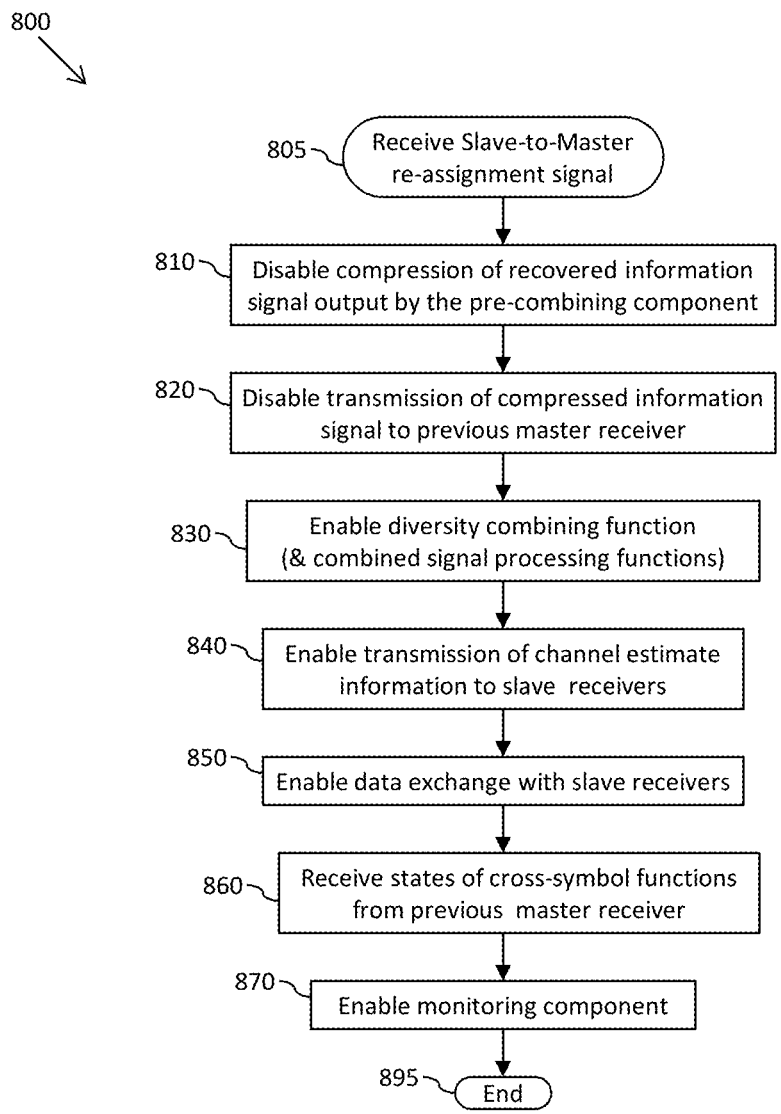

FIG. 8 illustrates a simplified flowchart 800 of an example of a method of re-configuring a wireless receiver from a slave receiver role to a master receiver role, such as may be implemented within the controller components 475 of the wireless receivers 410, 420 of FIG. 4. The method starts at 805 with the receipt of a slave-to-master re-assignment signal, for example received over the digital link 465 from the monitoring component 470 of a previously assigned master receiver. Compression of recovered information output by pre-combining component is disabled at 810. Transmission of compressed recovered information to previously assigned master receiver is disabled at 820. A diversity combining function, for example the (MRC) module 441 in FIG. 4, is enabled at 830. In some example embodiments, it is contemplated other processing functionality within the combined-signal component 440 may also be enabled such as the soft de-mapping module 442, the Viterbi decoder module 443 convolution encoder module 444 etc. Transmission of channel estimate information to slave receivers is enabled at 840. Data exchange with slave receivers is enabled at 850. The states of cross-symbol functions are received from the previously assigned wireless receiver, at 860, and the corresponding cross-functions configured in accordance with the received states. Such cross-symbol functions may comprise, for example, Viterbi state/initialisation, CRC (cyclic redundancy check) state/initialisation, current address to which output data is to be written to, etc. The monitoring component 470 is then enabled at 870, and the method ends at 895.

Thus, example embodiments of a method and apparatus for dynamically assigning master/slave roles within a distributed antenna diversity receiver apparatus have been described and illustrated in the accompanying drawings. Advantageously, by enabling such dynamic re-assigning of the master slave roles, the master receiver role may be dynamically re-assigned during reception of a data packet to ensure the most reliable channel is used for the master signal during diversity combining, and thus to ensure optimal recovery of the original transmitted signal, even in the case of a mobile channel such as typically would be experienced in, for example, V2X communications DAB communications, DRM communications, etc., where the channel characteristics are time-varying. Furthermore, by improving the performance, dynamic master-slave re-assignment can enable more aggressive compression of data exchanged for the same reception quality.

Such master-slave re-assignment will result in different parts of a received data packet being output by different wireless receivers 410, 420. Accordingly, the received packet may be re-constructed by concatenating the parts of the data packet output by the different wireless receivers 410, 420. This may be achieved more easily when all wireless receivers 410, 420 output received data to shared memory, and when each previously assigned master wireless receiver during re-assignment sends the current write position of output data to the newly assigned master wireless receiver. In this case, the data packet may be automatically re-assembled in the shared memory.

In alternative embodiments, all processing functions (i.e. all functions within the combined-signal component 440) may remain enabled within the slave receivers, thereby avoiding the need for state exchange between previously assigned and newly assigned master receivers. However, in such an arrangement the Viterbi decoders of the slave receivers will only receiver locally recovered information that is inferior to the diversity combined recovered information that Viterbi decoder of the master receiver is using.

It is contemplated that the invention is applicable not only to distributed diversity but also to one chip diversity when a slave signal is loosely compressed. Furthermore, data exchange between slave and master receivers may be implemented anywhere is the RX chain. For example, in the example illustrated in FIG. 4 data exchange occurs using equalized I/O samples. However in alternative embodiments, LLR (Log Likelihood Ratio) data output by the Soft Demapper module may alternatively be exchanged with the compression being very similar technique in performance and can be used. MRC as a diversity algorithm is just an example diversity combining technique, and it is contemplated that alternative techniques such as LLR combining may be implemented. It is also contemplated that sub-symbol re-assignment of master-slave roles may be performed, e.g. down to per-sample. However, other functions that are operating on whole symbols would need to exchange their states which increases the data exchange. Also for some standards there will be no notion of symbols but there may be other boundaries when the states of many functions are reset and easy (requiring not too much data exchange) reconfiguration can be performed.

It will be appreciated that the wireless receivers 410, 420 herein described and as illustrated in the accompanying drawings may be implemented as integrated circuits where the various functions are implemented as hardware blocks, computer program code running on (digital signal) processors, or a combination of hardware and software.

Accordingly, at least part of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A wireless receiver for a distributed antenna diversity receiver apparatus; the wireless receiver comprising:
   a pre-combining component arranged to receive a radio frequency, RF, signal from an antenna and to recover and output an information signal contained within the received RF signal, and
   a combined-signal component arranged to, when the wireless receiver is configured to operate in a master receiver role, receive the recovered information signal output by the pre-combining component of the wireless receiver and at least one further recovered information signal from at least one further wireless receiver, and to perform diversity combining of the recovered information signals to obtain and output an enhanced information signal;
   wherein the wireless receiver further comprises a monitoring component arranged to:
      receive intra-packet channel reliability parameters for the wireless receiver and for the at least one further wireless receiver, wherein the at least one further wireless receiver is independent of the wireless receiver and coupled to the wireless receiver via a bi-directional communication link,
      determine whether to assign a new master receiver for the distributed antenna diversity receiver apparatus based on the received intra-packet reliability parameters, and
      if it is determined to assign a new master receiver, dynamically re-assign the master receiver within the distributed antenna diversity receiver apparatus.

2. The wireless receiver of claim 1, wherein the monitoring component is arranged to determine whether to assign a new master receiver for the distributed antenna diversity receiver apparatus based on an absolute difference between an intra-packet channel reliability parameter for a current master receiver and an intra-packet channel reliability parameter for each slave receiver.

3. The wireless receiver of claim 1, wherein the monitoring component is arranged to determine whether to assign a new master receiver for the distributed antenna diversity receiver apparatus every n symbols of a data packet being received, where n≥1, wherein n is a natural number.

4. The wireless receiver of claim 3, wherein n is dynamically configured based on previous master re-assignments for the data packet being received.

5. The wireless receiver of claim 1, wherein the monitoring component is further arranged to receive initial channel reliability parameters for a preamble of a data packet being received in relation to the wireless receiver and the at least one further wireless receiver, select a receiver to be an initial master receiver based on the received initial channel reliability parameters, and to assign the selected receiver as the initial master receiver for the distributed antenna diversity receiver apparatus.

6. The wireless receiver of claim 1, wherein:
the wireless receiver further comprises a controller component arranged to configure the wireless receiver to operate in one of the master receiver role in which the combined signal component is arranged to perform diversity combining of the recovered information signals, and a slave receiver role in which the recovered information signal output by the pre-combining component of the wireless receiver is transmitted to the at least one further wireless receiver for diversity combining; and
the monitoring component is arranged to re-assign the wireless receiver from the master receiver role to the slave receiver role by signalling to the controller component to configure the wireless receiver to operate in the slave receiver role.

7. The wireless receiver of claim 6, wherein the controller component is further arranged to receive via a digital link a signal from the at least one further wireless receiver to configure the wireless receiver to operate in the master receiver role.

8. The wireless receiver of claim 7, wherein upon receipt of the signal from the at least one further wireless receiver to configure the wireless receiver to operate in the master receiver role, the controller component is further arranged to receive via the digital link an indication of a state of at least one cross-symbol function and to configure the state of at least one corresponding cross-symbol function of the wireless receiver according to the received indication.

9. The wireless receiver of claim 6, wherein upon receipt of the signal from the monitoring component to configure the wireless receiver to operate in the slave receiver role, the controller component is further arranged transmit an indication of a state of at least one cross-symbol function of the wireless receiver to at least one further wireless receiver via a digital link.

10. The wireless receiver of claim 9, wherein the monitoring component is arranged to re-assign the at least one further wireless receiver from a slave receiver role to a master receiver role by signalling to a controller component of the at least one further wireless receiver via the digital link to configure the at least one further wireless receiver to operate in the master receiver role.

11. The wireless receiver of claim 8, wherein when configured to operate in the master receiver role the wireless receiver is arranged to;
receive compressed recovered information and intra-packet channel reliability parameters from the at least one further wireless receiver;
perform decompression of the compressed recovered information and provide the decompressed recovered information to the combined-signal component for performing diversity combining; and
derive channel estimate information for the at least one further wireless receiver based on the received intra-packet channel reliability and to transmit the derived channel estimate information to the at least one further wireless receiver.

12. The wireless receiver of claim 8, wherein when configured to operate in the slave receiver role the wireless receiver is arranged to:
perform compression of recovered information output by the pre-combining component;
transmit the compressed recovered information to the at least one further wireless receiver configured to operate in the master receiver mode for performing diversity combining;
receive channel estimate information from the at least one further wireless receiver configured to operate in the master receiver mode; and
perform channel tracking for recovering the information signal contained within the received RF signal based on the received channel estimate information.

13. A distributed antenna diversity receiver apparatus comprising at least two wireless receivers according to claim 1.

14. A distributed wireless communication system comprising the distributed antenna diversity receiver apparatus of claim 13.

15. A method of dynamically assigning master/slave roles within a distributed antenna diversity receiver apparatus; the method comprising:
receiving intra-packet channel reliability parameters for a master wireless receiver and for at least one slave wireless receiver, wherein the at least one slave wireless receiver is independent of the master wireless receiver and coupled to the master wireless receiver via a bi-directional communication link,
determining whether to assign a new master receiver for the distributed antenna diversity receiver apparatus based on the received intra-packet reliability parameters, and
if it is determined to assign a new master receiver, dynamically re-assigning the master receiver within the distributed antenna diversity receiver apparatus.

* * * * *